UNITED STATES PATENT OFFICE.

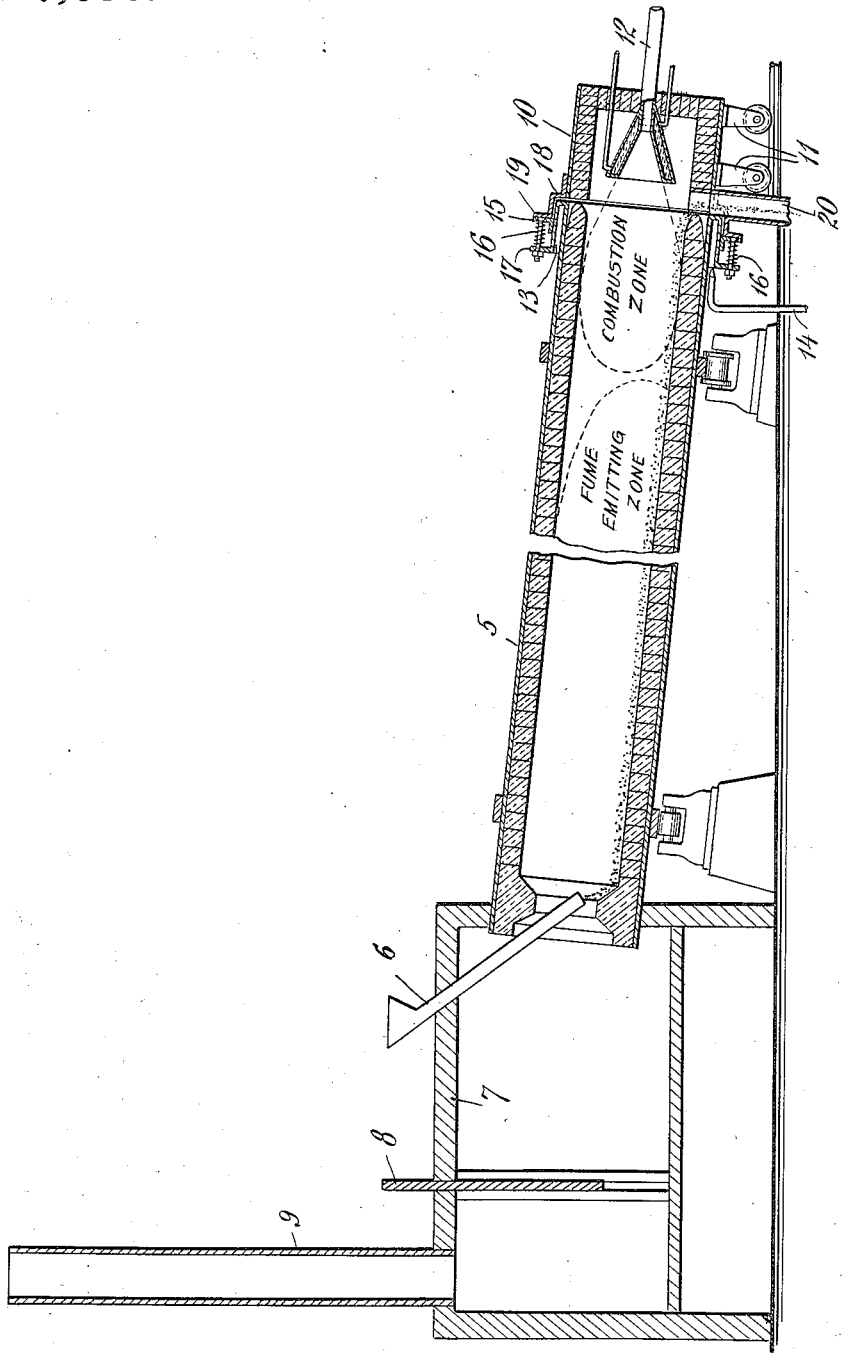

HOWARD F. CHAPPELL, OF NEW YORK, N. Y.

APPARATUS FOR CALCINING ALUNITE.

1,317,686. Specification of Letters Patent. Patented Oct. 7, 1919.

Original application filed May 28, 1918, Serial No. 236,981. Divided and this application filed January 14, 1919. Serial No. 271,032.

*To all whom it may concern:*

Be it known that I, HOWARD F. CHAPPELL, a citizen of the United States, residing at New York city, in the county of New York, State of New York, have invented certain new and useful Improvements in Apparatus for Calcining Alunite, (division of application Ser. No. 236,981;) and I do hereby declare the following to be a full, clear, and exact description of the invention, such as will enable others skilled in the art to which it appertains to make and use the same.

My invention relates to an improved apparatus for calcining alunite, or the like. The present case is a division of my application, Serial No. 236,981, filed May 28, 1918.

In U. S. Letters Patent No. 1,070,324, granted to me on August 12, 1913, I have described the process of obtaining aluminum oxid and potassium sulfate from natural deposits of alum stone, alum rock, or alunite, by calcining the alunite, or the like, until the aluminum content thereof is substantially converted into insoluble aluminum oxid and the potassium content thereof is converted into potassium sulfate. Alunite, when heated or calcined in accordance with the invention of my aforementioned patent, gives off water-vapor and oxids of sulfur, principally sulfur dioxid. The calcined residue is composed principally of potassium sulfate and alumina, and is lixiviated with water in order to dissolve out the soluble potassium sulfate, leaving the alumina behind in the leached tailings.

It has heretofore been the practice to calcine alunite in an ordinary rototary cement kiln of the general construction employed in the calcining of cement. I have discovered however that alunite cannot be satisfactorily calcined in kilns of this type unless as hereinafter pointed out, certain precautions are taken and certain conditions properly maintained.

The present invention is based primarily upon the discovery that in calcining alunite in a rotary kiln, it is important that the zone of combustion of the fuel should be nearer to the discharge end of the kiln than the point at which substantially all of the oxid of sulfur fumes are removed from the calcined alunite. In other words, substantially complete combustion of the fuel should take place before the combustion gases come in contact with the said fumes. If this condition is not maintained during the calcining of the alunite, I have found that several difficulties are likely to arise.

In the first place, if the oxid of sulfur fumes which are evolved from the alunite during the calcining thereof are mixed in any considerable quantities with the fuel vapors or gases before practically complete oxidation or combustion of the latter, it is impossible to maintain a sufficiently high temperature to thoroughly or suitably calcine the alunite, no matter how much fuel, or how much air may be introduced. Thus, if the oxid of sulfur fumes evolved from the alunite mix with the incompletely ignited fuel vapors or gases a portion of the fuel passes over the ore before it is burned or consumed. This condition may be remedied for a time, when employing oil as the fuel, by using an excess of air or by using a steam jet, but the remedy is effective for only a few minutes, and such expedients are objectionable because of the great loss in dust which results from their use.

The proper calcination of the alunite is a matter of particular importance from a practical standpoint. If the alunite is not properly calcined, there is not only a loss of potassium compounds and alumina in the unroasted portion of the ore, but potash alum is formed which attacks the pipes and all the apparatus used in the subsequent extraction and recovery of the potassium compounds. Furthermore, if the incompletely ignited fuel gases come in contact with the alunite before the complete evolution of the oxid of sulfur gases therefrom, the potassium compounds are reduced to sulfid, and the leaching liquors become alkaline, which has a very deleterious effect on the leaching operation. Furthermore, under such conditions of calcination, there is a much heavier loss of potassium compounds from volatilization, and the dust loss is greater.

The present invention involves the calcining of alunite, or the like, under such conditions that the products of combustion of the fuel are completely oxidized or burned before mingling with the oxid of sulfur fumes evolved from the ore. In calcining alunite, or the like, in a rotary kiln, there is a zone, in the travel of the ore from the entrance or feed end of the kiln to its discharge end, beyond which substantially no gases are evolved from the ore. In accordance with my present invention, the operating conditions are so maintained that this zone is nearer the entrance or feed end of the kiln than is the zone of combustion of the fuel. Thus the invention involves the maintenance of such conditions that the zone of combustion of the fuel is not substantially contaminated with the fumes evolved from the ore.

In the accompanying drawing, I have illustrated an apparatus embodying the present invention. This apparatus is generally of the rotary kiln type, but involves certain modifications which particularly adapt it for calcining alunite in accordance with the present invention.

The calcining apparatus illustrated in the accompanying drawing comprises a rotary kiln 5, of substantially the same general type as employed in calcining cement, lime, or the like. This kiln is inclined so that during its rotation the material fed into the upper end thereof gradually travels toward the lower end from which it is discharged into a suitable receptacle, conveyer, or the like. The alunite is fed into the front or upper end of the kiln 5 by means of a suitable feed hopper 6. This end of the kiln projects into a settling chamber 7 provided with an adjustable damper 8 and a stack 9, from which the fumes evolved during the calcining of the alunite may be withdrawn.

In accordance with my present invention, a movable fire-box is associated with the lower or discharge end of the kiln 5. The movable fire-box comprises a short cylinder 10 of substantially the same diameter as the kiln. The length of the cylinder 10 will, of course, depend to some extent, upon the size of the apparatus in general, but in the case of an ordinary cement kiln 135 feet long, I have found a length of about 5 feet to be satisfactory. The cylinder 10 is mounted on a truck 11, and is thus adapted to be moved toward or away from the lower or discharge end of the kiln 5. The cylinder 10 is provided with a suitable fuel injector burner 12 of any suitable type. The other end of the cylinder is designed to abut directly against the discharge end of the kiln.

A cylindrical ring or shell 13 is secured to the lower end of the kiln 5 and is separated from the outer surface of the kiln by an air space. A current of air is adapted to be blown into this air space by means of the air pipe 14, and in this manner the lower or discharge end of the kiln is suitably cooled. A sealing ring 15 is resiliently and slidably mounted on the outside of the shell 13 by means of springs 16 and bolts 17. An apron 18 is secured to the cylinder 10 of the movable fire-box and has an outer ring or flange 19 adapted to engage the ring 15 and form therewith a substantially air-tight seal around the junction of the kiln and fire-box when the latter is in its operative position.

The sealing means between the kiln and the fire-box effectively prevents the entrance into the kiln of any air, other than that admitted with the fuel through the burner 12. When the entrance of air is thus prevented around the end of the kiln, it becomes necessary to cool the end of the kiln, and the current of air provided by the air pipe 14 and the air-cooling space between the kiln and the shell 13 proves very effective for this purpose. As the kiln expands, the fire-box is pushed backward, but due to the resilient mounting of the sealing ring 15, the air-tight seal between the kiln and the fire-box is maintained. A discharge chute 20 is preferably associated with the movable fire-box and the calcined alunite drops through the chute into any suitable receptacle or conveyer. The gas pressure within the kiln will be sufficient to prevent the entrance through this chute of air into the lower end of the kiln when the kiln is in operation.

If for the sake of brevity we call the feed end of the kiln the "front end", and the discharge end the "back end", then, in accordance with my present invention, the fuel used for calcination must be practically completely burned in a zone which is behind the zone giving off oxid of sulfur gases. Assuming that we are using powdered coal as the fuel, and the kiln is being fed to its capacity with alunite ore, the maximum capacity of the kiln is obtained when the combustion zone is held at a definite point as near the back end of the kiln as possible, and the zone where the oxid of sulfur gases are substantially entirely eliminated is held immediately in front of the maximum combustion zone.

The relation between the combustion zone and the zone of fume evolution is effected by several factors. I have found that the following conditions are important for such a maintenance of the combustion and fume zones as is contemplated by my present invention. The ore fed into the kiln should be of a substantially uniform size, and the feed should be as nearly uniform as possible. The kiln should likewise be rotated at a substantially uniform speed, in order that the travel of the ore through the kiln may be substantially uniform. In using pulverized coal as the fuel, the coal should be of a substantially uniform fineness, and its composition should be substantially uniform. In particular, the amount of moisture associated with the pulverized coal should be as uniformly distributed as possible. Then too, the mixture of the pulverized coal with the air, for combustion, should be maintained substantially uniform. By giving careful attention to these preliminary precautions, and by excluding the entrance of an excessive or uncontrolled amount of false air into the discharge or lower end of the kiln, the position of the combustion zone can be so maintained that the fuel is not contaminated during combustion by fumes evolved from the alunite.

By means of the burner and movable fire-box illustrated in the accompanying drawing, I have been able to obtain almost complete combustion of powdered coal in a zone ranging from 10 to 25 feet from the discharge end of the kiln. When the operator observes dense fumes of sulfuric acid emitting from the calcined ore from the discharge end of the kiln, he immediately slows down the speed of the kiln, which also slows down the feed of the kiln. Frequently, in a few minutes the ore will stop giving off acid fumes and remain neutral in action without giving off fumes for hours at a time. If the kiln were not stopped or other means taken to remove the fumes from the combustion zone, complete combustion gases would quickly cease, the kiln would grow colder, under-calcined ore would be discharged, fumes would increase greatly, and if conditions were not corrected the ore could not be properly or completely calcined.

It is desirable that the ore running out of the kiln should not fall from the kiln into the elevator boot from which it is removed. This creates a sudden evolution of gases and dust which interferes with the burning of the fuel and alters the relative positions of the combustion zone and fume-emitting zone.

The entrance of air into the lower end of the kiln, other than that admitted with the fuel through the burner 12, should be prevented as far as possible, since it tends to shift the combustion zone. By using the type of burner and movable fire-box illustrated in the accompanying drawing and by keeping the combustion zone very close to the discharge end of the kiln, there is created a sudden expansion of gases at this point which goes a long way to overcome any excessive air leaks at the fire-box or around the end of the kiln. Furthermore, by carefully regulating the damper 8, the leaking of false air into the fire-box end of the kiln can be materially minimized. Furthermore, the construction of the substantially airtight seal between the lower end of the kiln and the movable fire-box is such as to effectively prevent the entrance of much false air into this end of the kiln, although a small amount of air may even be admitted at this point without materially interfering with the desired relationship between the combustion zone and the fume-emitting zone. In this manner, and by observing the precautions hereinbefore mentioned, the conditions of operation are maintained substantially uniform, and the necessary relation between the combustion zone and the fume-emitting zone is satisfactorily maintained.

What I claim is:

1. A calcining apparatus comprising a rotary kiln, a fire-box movably associated with one end of said kiln, and means for substantially preventing the entrance of air into said kiln through the junction of the kiln and fire-box when the latter occupies its operative calcining position; substantially as described.

2. A calcining apparatus comprising a rotary kiln, a fire-box movably associated with one end of said kiln, an apron secured to said fire-box, and a flange resiliently mounted on said kiln and arranged to engage said apron when the fire-box occupies its operative position with respect to the kiln, said apron and flange being arranged to provide a substantially air-tight seal between the kiln and fire-box; substantially as described.

3. A calcining apparatus comprising a rotary kiln, a movable fire-box associated with one end of said kiln, means associated with the fire-box and with the kiln for providing a substantially air-tight junction between the kiln and the fire-box when the latter occupies its operative calcining position, and means for cooling the cylindrical surface of the kiln immediately adjoining the air-tight junction, substantially as described.

4. A calcining apparatus comprising a rotary kiln, a movable fire-box associated with one end of said kiln, and resilient means associated with the fire-box and with the kiln for providing a substantially air-tight junction between the kiln and the fire-box and for permitting the movement of the fire-box due to expansion of the kiln; substantially as described.

5. A calcining apparatus comprising a rotary kiln, a fire-box movably associated with one end of said kiln, a cylindrical shell secured near the same end of said kiln and separated therefrom by an air space, and means for blowing a cooling current of air into said space; substantially as described.

6. A calcining apparatus comprising a rotary kiln, a fire-box associated with one end of said kiln, means associated with the fire-box and with the kiln for providing a substantially air-tight junction between the kiln and the fire-box, and means for cooling the end of the kiln with which said fire-box is associated; substantially as described.

7. A calcining apparatus comprising a rotary kiln, a movable fire-box associated with one end of said kiln, a burner projecting into said fire-box, an apron secured to said fire-box, a cylindrical shell secured to said kiln and separated therefrom by an airspace surrounding the end of the kiln with which said fire box is associated, a flange resiliently secured to said shell and arranged to engage said apron when the fire-box occupies its operative calcining position, and means for blowing a cooling fluid into said air space; substantially as described.

In testimony whereof I affix my signature.

HOWARD F. CHAPPELL.